US006550945B2

(12) United States Patent
Chiu

(10) Patent No.: US 6,550,945 B2
(45) Date of Patent: Apr. 22, 2003

(54) LUMINOUS PEDAL FOR A BICYCLE

(75) Inventor: Chun-Chen Chiu, Taichung Hsien (TW)

(73) Assignee: Meng-Yu Liu, Tai-Ping (TW)

( * ) Notice: Subject to any disclaimer, the term of this patent is extended or adjusted under 35 U.S.C. 154(b) by 0 days.

(21) Appl. No.: 09/931,054

(22) Filed: Aug. 17, 2001

(65) Prior Publication Data

US 2003/0035295 A1 Feb. 20, 2003

(51) Int. Cl.[7] .................................................. H02P 9/00
(52) U.S. Cl. ...................... 362/473; 362/192; 362/545; 362/543; 362/540
(58) Field of Search ............................... 362/473, 545, 362/543, 540, 192; 340/432

(56) References Cited

U.S. PATENT DOCUMENTS 5,662,405 A * 9/1997 Kuo ............................ 362/72
5,902,038 A * 5/1999 Curry ......................... 362/473
6,104,096 A * 8/2000 Hicks .......................... 290/1 R

* cited by examiner

Primary Examiner—Sandra O'Shea
Assistant Examiner—Anabel Ton
(74) Attorney, Agent, or Firm—Fei-Fei Chao; Venable, Baetjer, Howard & Civiletti, LLP

(57) ABSTRACT

A luminous pedal for a bicycle has a body with an I-like frame formed therein. An axle hole is longitudinally defined through the frame. An end cover is assembled at the front end and has a second hole in alignment with the axle hole. An axle has a head extending out from the second hole. A plurality of permanent magnets is circumferentially provided thereon and arranged N-pole by S-pole alternately. A coil seat with a coil is secured in the chamber. The permanent magnets are received in the coil seat. Two luminous plates is respectively secured at the side parts of the body and each have a plurality of luminous elements and electrically connected with the coil by a wire so that when the pedal is operated by a user, current is generated to light the luminous elements.

18 Claims, 5 Drawing Sheets

LUMINOUS PEDAL FOR A BICYCLE

BACKGROUND OF THE INVENTION

1. Field of the Invention

The present invention is related to a bicycle, and more particularly to a luminous pedal for a bicycle.

2. Description of Related Art

A bicycle generally has reflectors provided at the rear fender or the rack. Moreover, pedals of the bicycle also each have two reflectors respectively provided at two sides thereof. However, these reflectors can only reflect light and not emit light by themselves. Thus, in darkness without enough light to reflect, the reflectors cannot be seen and it is very dangerous for the rider or other road users nearby.

Therefore, the invention provides a luminous pedal to mitigate and/or obviate the aforementioned problem.

SUMMARY OF THE INVENTION

The main objective of the invention is to provide a pedal which is luminous in operation.

Other objects, advantages and novel features of the invention will become more apparent from the following detailed description when taken in conjunction with the accompanying drawings.

DETAILED DESCRIPTION OF THE PREFERRED EMBODIMENT

Figure 1:
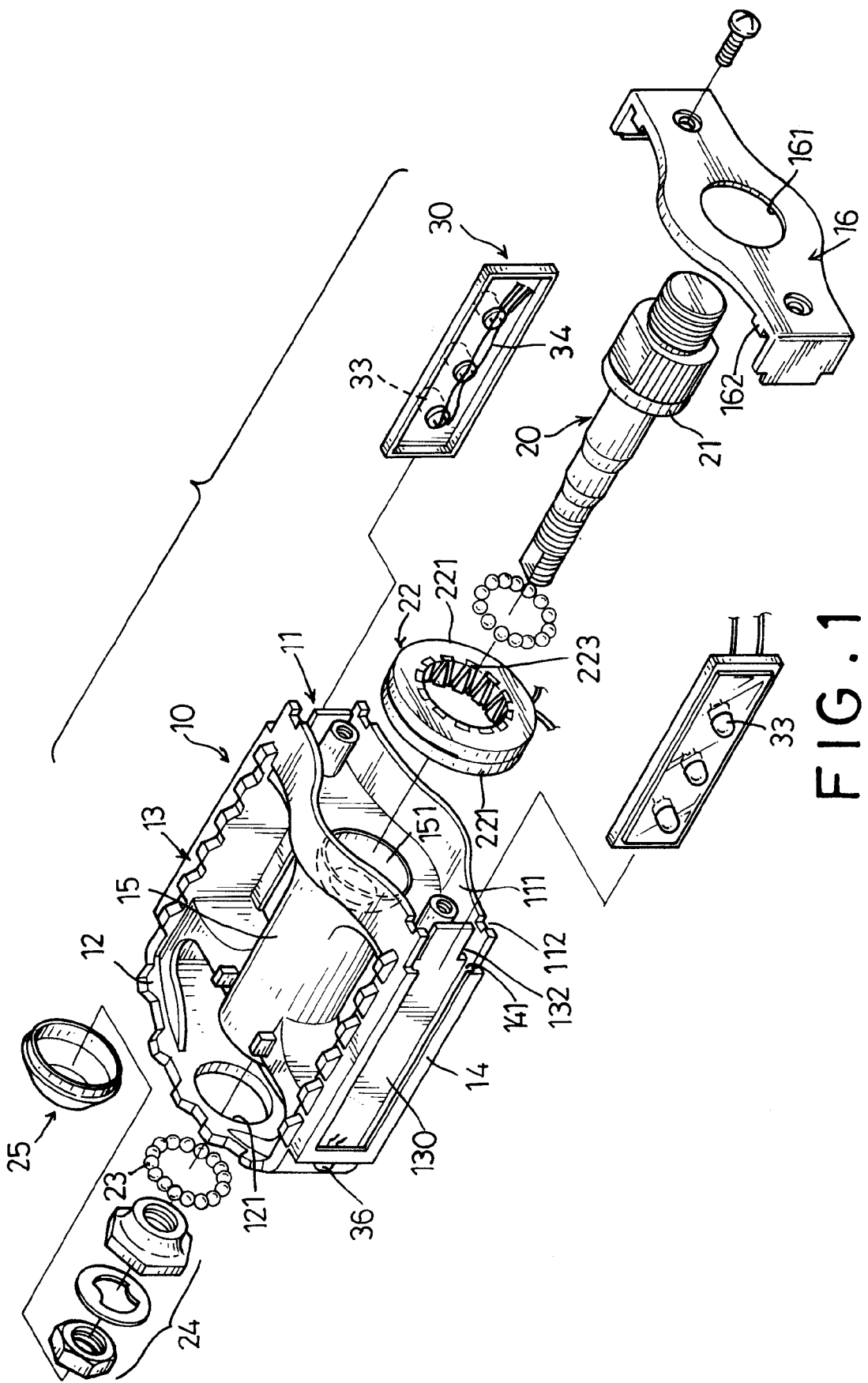
FIG. 1 is an exploded perspective view of a luminous pedal in accordance with the invention.
Figure 2:
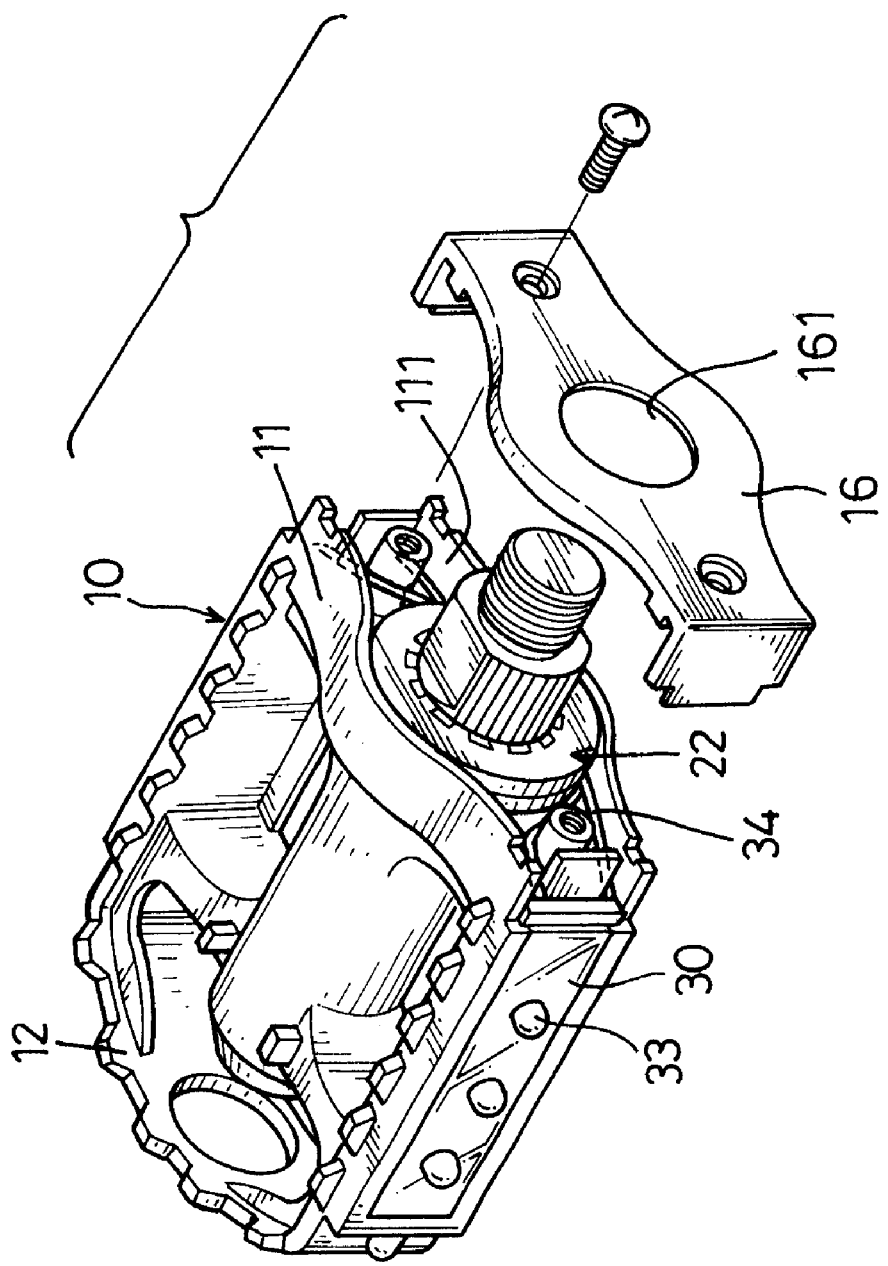
FIG. 2 is a perspective view of the luminous pedal with an end cover shown in an exploded view.
Figure 3:
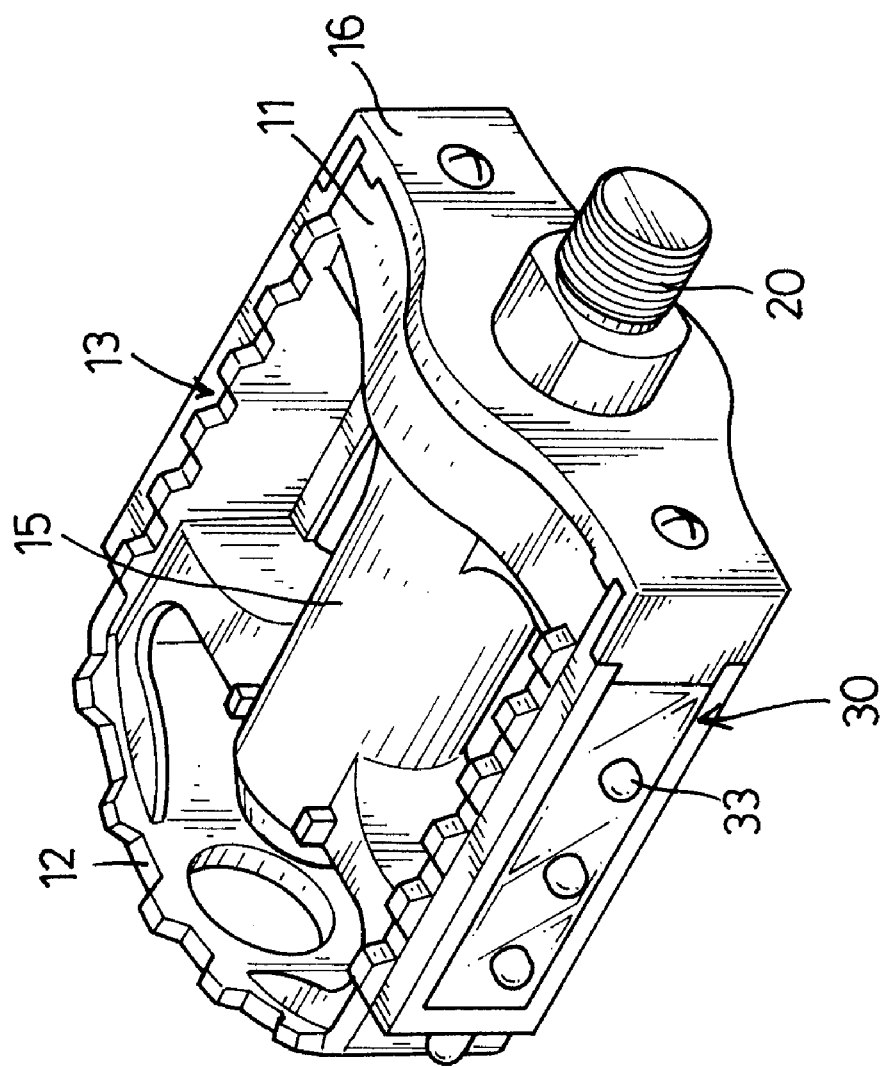
FIG. 3 is a perspective view showing the luminous pedal in assembly.

Referring to FIGS. 1–3, a pedal in accordance with the invention has a body (10) formed with a front end (11), a rear end (12) and two opposite side parts (13) formed between the front end (11) and the rear end (12). An I-like frame (15) is formed in the body (10) and has an axle hole (151) longitudinally defined therethrough for an axle (20) extending therein.

The front end (11) has a chamber (111) and four first notches (112) are in pairs defined at ends of an upper wall and a lower wall of the chamber (111). A coil seat (22) is secured in the chamber (111) and is composed of two ring housings (221) integrated together by welding. Each of the ring housings (221) has a plurality of triangular teeth (not numbered) formed thereon. A coil (223) is received in the ring housings (221) and the triangular teeth of the ring housings (221) are bent inwards to alternately abut the coil (223) to secure it to the ring housings (221).

Figure 4:
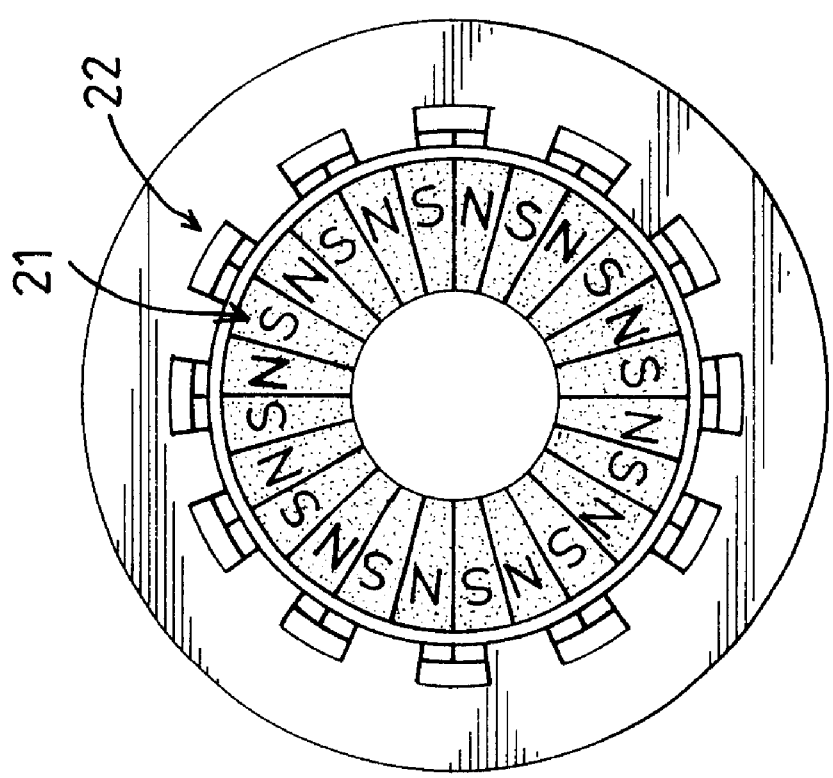
FIG. 4 is a cross sectional view of a coil seat and permanent magnets in the luminous pedal.

The axle (20) is inserted through the coil seat (22) and has a plurality of permanent magnets (21) circumferentially provided thereon and received in the coil seat (22) to align the permanent magnets (21) with the coil (223). The magnetic poles of the permanent magnets (21) are alternately arranged N-pole by S-pole as shown in FIG. 4. Furthermore, two ball-rings (23) are received in the axle hole (151) and provided on the axle (20) to enable the axle (20) to rotate in the axle hole (151). A distal end of the axle (20) extends out from the axle hole (151) and is fastened by a fastener assembly (24). A bowl (25) covering the fastener assembly (24) is assembled on the distal end of the axle (20).

The rear end (12) has a first hole (121) defined therethrough and aligned with the axle hole (151). The fastener assembly (24) is accessed in the body (10) via the first hole (121).

An end cover (16) is assembled to the front end (11) and has a second hole (161) defined therethrough for a head (not numbered) of the axle (20) extending thereout. The end cover (16) further has four lugs (162) formed on a surface facing to the body (10) and respectively engaged in the first notches (112).

The side parts (13) each have a side wall (130) and two second notches (132) defined at a top and a bottom of the front end of the side wall (130). Each side wall (130) has a U-like bar (14) formed thereon and a channel (141) is defined between the side wall (130) and the bar (14). The channels (141) each have an open front end and a closed rear end. Two luminous plates (30) are respectively inserted in the channels (141) via the open end.

The luminous plates (30) each have a plurality of first luminous elements (33) assembled thereon and electrically connected with the coil (223) by a wire (34). The wires (34) are respectively passed through and positioned in the second notches (132). Furthermore, at least one second luminous element (36) is provided at the rear end (12) and electrically connected with the coil (223) by the wire (34). The luminous elements (33, 36) can be bulbs, LEDs and so on.

Figure 5:
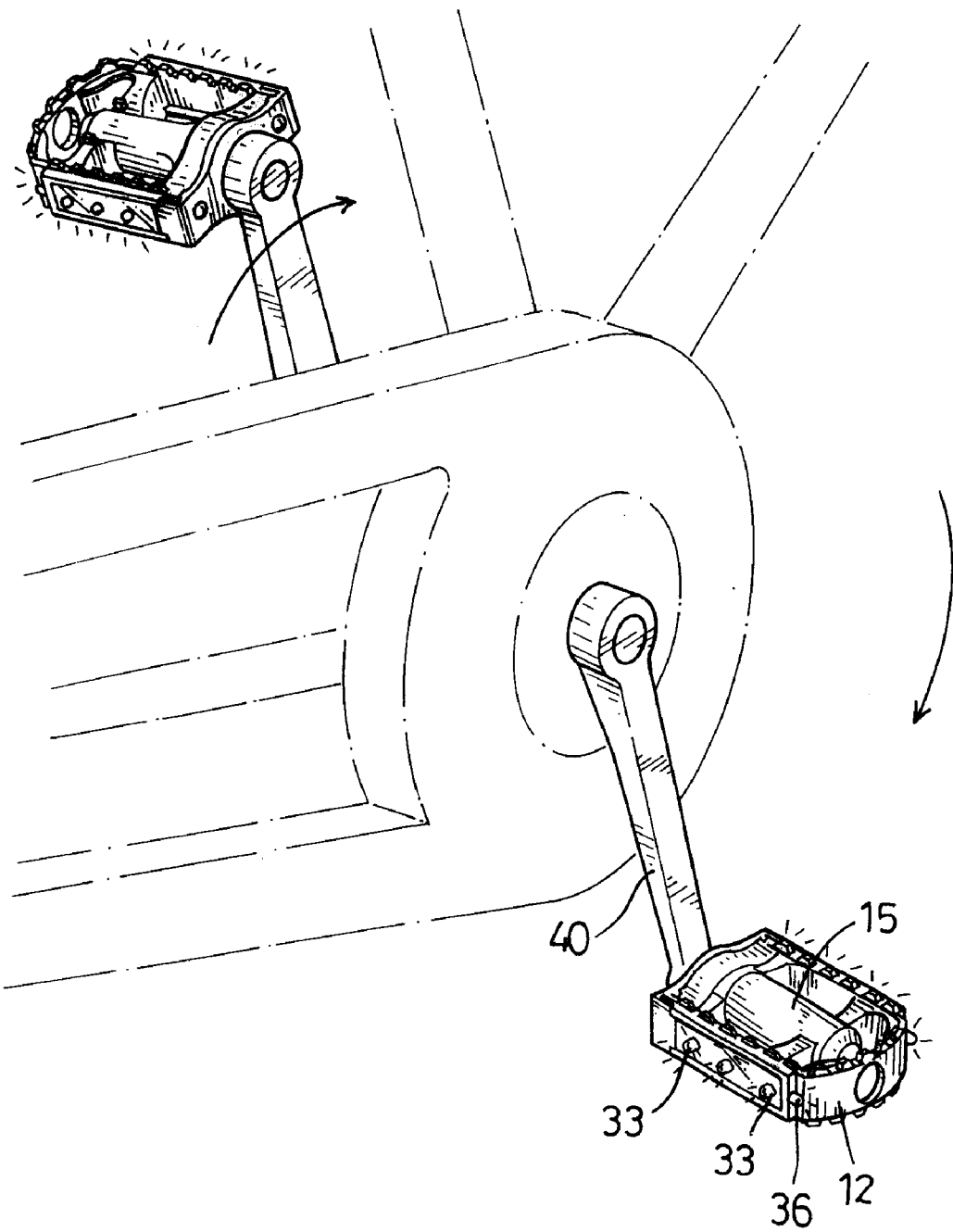
FIG. 5 is a schematic view showing that the luminous pedal is assembled on a bicycle.

The assembled pedal is shown in FIG. 3. The pedal is assembled on a bicycle by the head thereof engaged with a crank (40), as shown in FIG. 5.

When a user operates the pedal, the body (10) is rotated about the axle (20). In this case, the permanent magnet (21) is stationary, and the coil (223) is rotated with the body (10) to continuously cross magnetic fields of the permanent magnet (21) whereby a current is generated in the coil (223) and the luminous elements (33, 36) are powered on and lit.

From the above description, it is noted that the invention has the following advantages:

1. The pedal will emit light by the luminous elements as long as a user operates it, so that the bicycle is noticeable even if there is not enough light around.

2. Because the luminous plates are inserted in the channels, it is very convenient to replace them if the luminous elements are damaged.

3. The luminous elements can be provided with various colors to attract customers and the bicycle with this pedal will have a good commercial competitiveness.

4. The luminous elements do not require batteries and so a user is not hampered by batteries which need to be replaced.

5. The pedal generates electricity during normal operation of the bicycle, that is, without any extra friction as experienced with a tire rim generator.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A luminous pedal for a bicycle, the luminous pedal comprising:
    a body (10) formed with:
        a front end (11),
        a rear end (12),
        two opposite side parts (13), each connecting to the front end (11) and the rear end (12),
        a frame (15) formed therein,
        an axle hole (151) longitudinally defined through the frame (15),
        a chamber (111) defined at the front end (11),
        a first hole (121) defined at the rear end (12) and in alignment with the axle hole (151), and
        an end cover (16) assembled at the front end (11) and having a second hole (161) in alignment with the axle hole (151),
        wherein each side part (13) has a side wall (130), and a U-like bar (14) formed on the side wall (130) to define a channel (141);
    an axle (20) rotatably received in the axle hole (151), the axle (20) having:
        a head extending out from the second hole (161) with a plurality of permanent magnets (21) circumferentially provided thereon and arranged N-pole by S-pole alternately, and
        a coil seat (22) with a coil (223) secured in the chamber (111), the permanent magnets (21) being received in and radially spaced apart from the coil seat (22); and
    two luminous plates (30) respectively and detachably inserted in the channels (141) of the side parts (13) of the body (10), each having a plurality of first luminous elements (33) and electrically connected with the coil (223) by a wire (34),
    whereby when the pedal is operated, the coil (223) is rotated relative to the axle (20) to continuously cross magnetic fields of the stationary permanent magnets (21) and generates current to light the luminous elements (33).

2. The luminous pedal as claimed in claim 1, wherein the front end (11) has four first notches (112) in pairs defined at ends of an upper wall and a lower wall of the chamber (111); and the end cover (16) has four lugs (162) formed at a surface facing the body (10) and respectively engaged in the first notches (112).

3. The luminous pedal as claimed in claim 1, wherein the side parts (13) each have two second notches (132) respectively defined at a top and a bottom of a front end thereof; and the wires (34) are respectively passed through and positioned in the second notches (132).

4. The luminous pedal as claimed in claim 1 further comprising at least one second luminous element (36) provided at the rear end (12) of the body (10) and electrically connected with the coil (223) by the wire (34).

5. The luminous pedal as claimed in claim 1, wherein the first luminous elements (33) are bulbs.

6. The luminous pedal as claimed in claim 1, wherein the first luminous elements (33) are LEDs.

7. The luminous pedal as claimed in claim 4, wherein the at least one second luminous element (36) is a bulb.

8. The luminous pedal as claimed in claim 4, wherein the at least one second luminous element (36) is an LED.

9. The luminous pedal as claimed in claim 1 further comprising two ball-rings (23) received in the axle hole (151) and provided on the axle (20).

10. The luminous pedal as claimed in claim 2, wherein the side parts (13) each have two second notches (132) respectively defined at a top and a bottom of a front end thereof, and the wires (34) are respectively passed through and positioned in the second notches (132).

11. The luminous pedal as claimed in claim 10 further comprising two ball-rings (23) received in the axle hole (151) and provided on the axle (20).

12. The luminous pedal as claimed in claim 11, where in the first luminous elements (33) are bulbs.

13. The luminous pedal as claimed in claim 11, wherein the first luminous elements (33) are LEDs.

14. The luminous pedal as claimed in claim 4, wherein the front end (11) has four first notches (112) in pairs defined at ends of an upper wall and a lower wall of the chamber (111); and the end cover (16) has four lugs (162) formed at a surface facing the body (10) and respectively engaged in the first notches (112).

15. The luminous pedal as claimed in claim 14, wherein the side parts (13) each have two second notches (132) respectively defined at a top and a bottom of a front end thereof, and the wires (34) are respectively passed through and positioned in the second notches (132).

16. The luminous pedal as claimed in claim 15 further comprising two ball-rings (23) received in the axle hole (151) and provided on the axle (20).

17. The luminous pedal as claimed in claim 16, wherein the first luminous elements (33) are bulbs.

18. The luminous pedal as claimed in claim 16, wherein the first luminous elements (33) are LEDs.

* * * * *